(12) United States Patent
Thompson

(10) Patent No.: US 8,303,446 B2
(45) Date of Patent: Nov. 6, 2012

(54) CONTROLLED DIFFERENTIAL

(75) Inventor: Robert William Thompson, Farnborough (GB)

(73) Assignee: Qinetiq Limited, London (GB)

( * ) Notice: Subject to any disclaimer, the term of this patent is extended or adjusted under 35 U.S.C. 154(b) by 507 days.

(21) Appl. No.: 12/529,615

(22) PCT Filed: Mar. 19, 2008

(86) PCT No.: PCT/GB2008/000970
§ 371 (c)(1),
(2), (4) Date: Sep. 2, 2009

(87) PCT Pub. No.: WO2008/117025
PCT Pub. Date: Oct. 2, 2008

(65) Prior Publication Data
US 2010/0105511 A1    Apr. 29, 2010

(30) Foreign Application Priority Data
Mar. 27, 2007   (GB) .................................. 0705845.6

(51) Int. Cl.
*F16H 3/72* (2006.01)
(52) U.S. Cl. ........................................................ 475/5
(58) Field of Classification Search .................. 475/18, 475/150, 28, 203, 204, 205, 5, 6, 207, 218, 475/219, 220, 221; 180/6.2, 6.38, 6.44, 6.48, 180/6.5, 6.6, 65.235, 65.24, 65.26, 65.51, 180/65.6, 65.7
See application file for complete search history.

(56) References Cited

U.S. PATENT DOCUMENTS

| | | |
|---|---|---|
| 1,423,940 A | 7/1922 | Jett |
| 4,813,506 A | 3/1989 | Smith |
| 6,955,623 B2 * | 10/2005 | Pattok ................................ 475/3 |
| 7,303,502 B2 * | 12/2007 | Thompson ...................... 475/296 |
| 7,326,141 B2 * | 2/2008 | Lyons et al. ..................... 475/28 |
| 7,686,726 B2 * | 3/2010 | Thompson ...................... 475/150 |
| 8,029,399 B2 * | 10/2011 | Thompson ...................... 475/150 |
| 2003/0236146 A1 | 12/2003 | Pattok |

FOREIGN PATENT DOCUMENTS

| | | |
|---|---|---|
| DE | 644 547 | 5/1937 |
| DE | 101 60 313 A1 | 3/2003 |
| GB | 2 393 485 A | 3/2004 |
| WO | WO 02/083482 A1 | 10/2002 |
| WO | WO 02/083483 A1 | 10/2002 |
| WO | WO 2005/054712 A1 | 6/2005 |
| WO | WO 2006/021745 A1 | 3/2006 |
| WO | WO 2007/077416 A1 | 7/2007 |

OTHER PUBLICATIONS

International Preliminary Report on Patentability for International Application No. PCT/GB2008/000970, issued Sep. 29, 2009, 7 pp, International Bureau of WIPO.

* cited by examiner

*Primary Examiner* — Justin Holmes
*Assistant Examiner* — David J Hlavka
(74) *Attorney, Agent, or Firm* — Oliff & Berridge, PLC

(57) ABSTRACT

A controlled differential, particularly for exercising steering control of skid steered vehicles, having a compound planetary gear set coupling two shafts. Respective ring gears turn with the shafts and mesh with a compound planet gear in a planet carrier, the ratios of the number of gear teeth between each ring gear and the respective gear of the compound planet being unequal so that when the planet carrier is stationary the two shafts are coupled through the differential to turn together in the same sense but with a speed difference, and controlled rotation of the planet carrier varies the speed difference between the shafts in accordance with the sense and speed of rotation of the planet carrier.

6 Claims, 3 Drawing Sheets

CONTROLLED DIFFERENTIAL

The present invention relates to a controlled differential, being a mechanism for coupling two shafts and controlling their relative speeds. The invention is particularly, though not exclusively, concerned with differential mechanisms for vehicular drive systems and more especially for exercising steering control of skid steered vehicles. Particular applications include the steering of a battle tank, bulldozer or other skid steered vehicle equipped with a drive configuration of the kind described in WO-02/083482, WO-02/083483 or WO-2006/021745, where the present invention may be used as an alternative to the double epicyclic controlled differential disclosed therein.

In one aspect the invention resides in a controlled differential adapted to couple two shafts and comprising: first and second ring gears arranged to turn with respective said shafts; a compound planetary gear set comprising one or more compound planet gears and a common planet carrier, a first planet gear of the or each said compound planet being in mesh with the first ring gear and a second planet gear of the or each said compound planet being in mesh with the second ring gear; the ratios of the number of gear teeth between the first ring gear and the or each said first planet gear and between the second ring gear and the or each said second planet gear being unequal; and means for controlling the rotation of said planet carrier; whereby if the planet carrier is stationary the two shafts are coupled through said ring gears and compound planet gears to turn together in the same sense with a speed difference; and rotation of the planet carrier varies the speed difference between the two shafts, the sense and magnitude of which variation depend respectively on the sense and speed of the rotation of the planet carrier.

In another aspect the invention resides in a drive configuration for a skid steered vehicle comprising a respective drive member (such as a track drive sprocket for a tracked vehicle or a wheel hub for a wheeled vehicle) adapted to be located at each side of the vehicle; a pair of propulsion motors coupled between said drive members; a controlled differential as defined above coupled between respective shafts which are arranged to be driven by said propulsion motors; and one or more steer motors coupled to rotate the planet carrier of said differential.

The manner of operation and other features of a differential and drive configuration according to the invention will now be more particularly described, by way of example, with reference to the accompanying drawings, in which.

Figure 1:
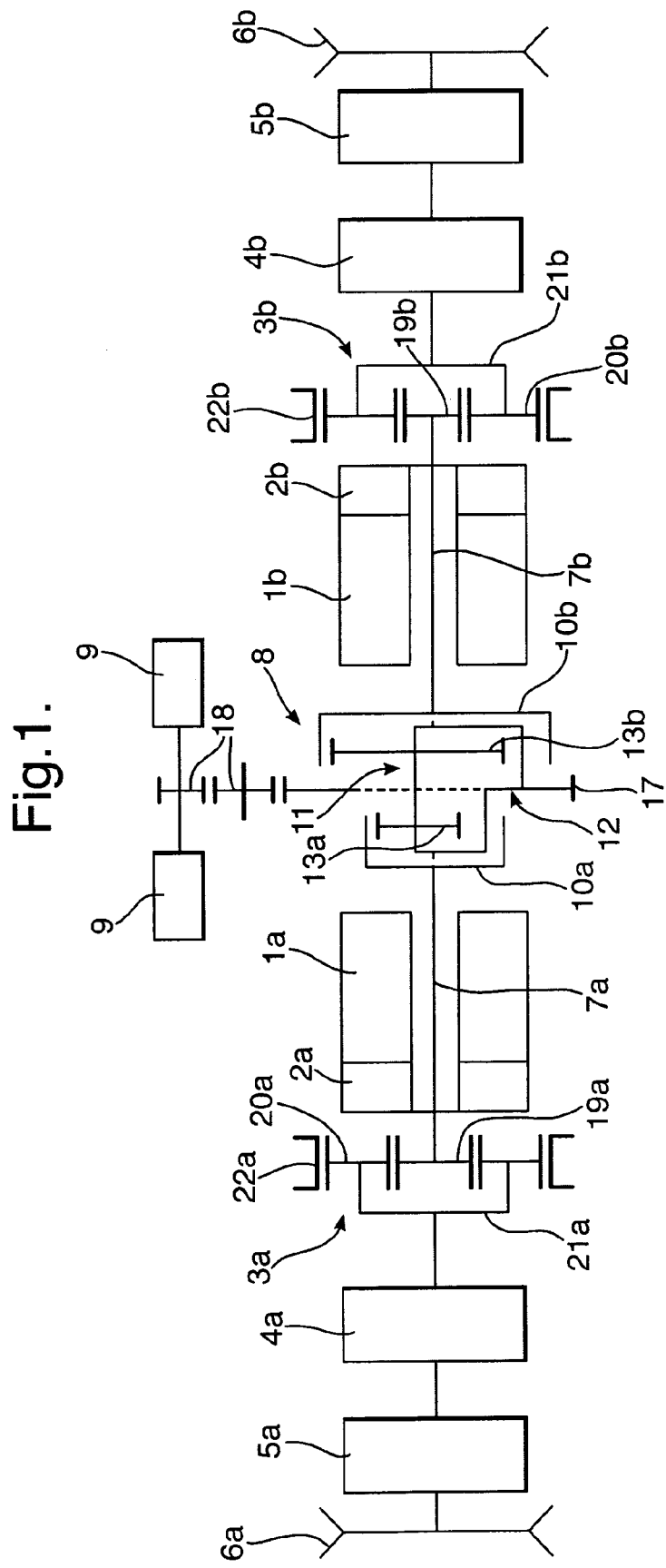
FIG. 1 is a diagrammatic representation of one embodiment of a differential according to the invention as used in a drive configuration for a skid steered vehicle.

FIG. 1 illustrates diagrammatically one form of vehicular drive configuration within which the present invention may be found particularly useful, being a track drive arrangement for a skid steered vehicle according to WO-02/083483. In this Figure a transverse drive arrangement comprises two electric propulsion motors 1a and 1b. Outboard of the motors the transmission includes in each case a gear (range) change unit 2a, 2b, planetary gear reduction stage 3a, 3b, brake 4a, 4b and final drive gear reduction 5a, 5b, leading to respective track drive sprockets 6a and 6b at opposite sides of the vehicle. Inboard the motor drive shafts 7a and 7b are coupled to opposite sides of a controlled differential 8 which can be driven by a coupled pair of electric steer motors 9.

Each range change mechanism 2a, 2b may be as described in WO-05/054712 and is integrated with the respective propulsion motor 1a, 1b so that the shafts 7a, 7b are driven by the motor rotors through the range change mechanisms and steering remains effective while making a gear change due to the permanent connection of the transmissions to the differential through shafts 7a, 7b, as described in WO-2006/021745. The components comprising propulsion motors 1a, 1b, range change mechanisms 2a, 2b, gear reductions 3a, 3b and controlled differential 8 may all be housed in a common generally cylindrical casing extending transversely of the vehicle as also shown in WO-2006/021745.

The mechanism of the controlled differential 8 is based on a parallel pair of planetary gear sets but comprising linked (compound) planet gears in a common planet carrier. More particularly, and referring also to FIG. 2, respective annuli or ring gears 10a and 10b are splined or similarly fastened to respective drive shafts 7a, 7b (the latter not seen in FIG. 2) so as to rotate with the respective drive shaft. In the illustrated embodiment ring gear 10b is of larger diameter and has a higher number of gear teeth than ring gear 10a. Each ring gear 10a, 10b meshes with respective gear portions of a compound planet gear 11 carried by a planet carrier 12. The compound planet 11 (see also FIG. 3) comprises a parallel pair of gears 13a, 13b united so as to turn together on a common axis—such as by welding or otherwise fastening two separate elements together or by cutting two sets of gear teeth on a single element—and is carried on needle roller bearings on a pin 14 extending across the carrier 12. In the illustrated embodiment the gear 13b of the compound planet is of larger diameter and has a higher number of gear teeth than the gear 13a. Gear 13a is in mesh with internal teeth 15a of ring gear 10a and gear 13b is in mesh with internal teeth 15b of ring gear 10b. The planet carrier 12 is borne for rotation independently of the shafts 7a, 7b, such as by stub axles 16a, 16b in bearings (not shown) held in the ends of the shafts 7a, 7b, and is formed with an external ring of gear teeth 17 by which it can be driven to rotate by the steer motors 9 through a spur gear train 18.

It will be appreciated that the mechanism of the differential 8 provides a permanent torque-transmitting connection between the shafts 7a and 7b by virtue of the meshing of both ring gears 10a and 10b with the same compound planet gear 11. The way in which this can be controlled to steer the vehicle will now be described.

Firstly let it be assumed that the steer motors 9 are energised to hold the planet carrier 12 stationary, and that this is the condition which is intended to pertain for straight line running of the vehicle. Energising the propulsion motors 1a, 1b to turn the drive shafts 7a, 7b in this condition rotates the ring gears 10a, 10b to cause the planet gear 11 to rotate in the stationary carrier 12. The power distribution between the two shafts 7a and 7b will be determined by the torque required to drive the respective sprocket 6a, 6b, with torque being transferred through the differential from one side to the other as required e.g. in response to changing ground conditions. However it is arranged that the gear ratios between the ring gears 10a, 10b and the respective gears 13a, 13b of the compound planet 11 with which they mesh are unequal, so in this condition the shafts 7a and 7b will be forced to run at different speeds. In the illustrated embodiment, considering the connection through the differential from ring gear 10a to ring gear 10b, there is an increase in speed from the ring gear 10a to the planet gear 13a and a decrease in speed from the planet gear 13b (which must turn at the same speed as the planet gear 13a) to the ring gear 10b, but since there is a greater ratio of tooth numbers between ring gear 10a and planet gear 13a than there is between ring gear 10b and planet gear 13b there is an overall increase in speed from ring gear 10a to ring gear 10b; (the inverse is of course true considering the connection from ring gear 10b to ring gear 10a). In other words in the illustrated embodiment, while the planet carrier 12 is stationary, shaft 7b must turn faster than shaft 7a.

It will be appreciated that, with the shafts 7a and 7b running at different speeds in this condition, if the same speed difference is (proportionally) reflected through the remainder of the transmissions between respective shafts 7a, 7b and sprockets 6a, 6b then the vehicle will not run straight but will turn. For this reason the gear ratios of the intervening reduction stages 3a and 3b are chosen to differ to compensate as nearly as practicable for the "straight running" speed difference between the shafts 7a and 7b. Each such reduction stage comprises a planetary gear mechanism with a sun gear 19a, 19b coupled to the respective shaft 7a, 7b, a set of conventional planet gears 20a, 20b in a carrier 21a, 21b which is coupled to the outboard transmission train, and a fixed annulus or ring gear 22a, 22b, with the tooth numbers of the gear elements chosen to achieve the desired reduction ratios between the rings and carriers. Compensation for the speed difference between the shafts 7a and 7b for straight line running could alternatively be provided by different ratios in the final drives 5a, 5b or in some other gear stages between the respective shaft 7a, 7b and drive sprocket 6a, 6b or even by choosing different sprocket or wheel sizes on opposite sides of the vehicle, or indeed by a combination of any of the indicated measures.

In any given transmission arrangement where the ratios of the various gear elements do not compensate fully for the speed difference between the shafts 7a, 7b for straight line running, the planet carrier 12 can be run by the steer motors 9 to make up for any remaining difference as seen at the drive sprocket 6a, 6b (the manner by which turning of the carrier 12 varies the speed difference between shafts 7a, 7b being explained below). For example in one particular embodiment of the illustrated transmission the chosen tooth numbers for each gear in the differential 8 and reduction stages 3a, 3b are as follows:

| | |
|---|---|
| ring gear 10a | 37 teeth |
| ring gear 10b | 52 teeth |
| planet gear 13a | 24 teeth |
| planet gear 13b | 39 teeth |
| sun gear 19a | 27 teeth |
| sun gear 19b | 22 teeth |
| planet gears 20a | 18 teeth |
| planet gears 20b | 20 teeth |
| ring gear 22a | 63 teeth |
| ring gear 22b | 63 teeth |

This results in a gear ratio across the differential 8 with a stationary carrier 12 of (to three decimal places) 1:1.156, a reduction ratio in stage 3a of 3.333:1 and a reduction ratio in stage 3b of 3.863:1. The compensatory ratio between the two reduction stages is therefore (to three decimal places) 1.159:1 which leaves a minor speed difference of approximately 0.25% to be compensated by turning the carrier 12 for straight line running.

To turn the vehicle while being propelled by the motors 1a, 1b the steer motors 9 are energised to rotate the planet carrier 12 of the differential 8 in the direction and at the speed which will vary the speed difference between the shafts 7a, 7b to the extent that, taking account of the different reduction ratios in stages 3a and 3b, a speed difference is imposed on the sprockets 6a, 6b to turn the vehicle in the direction and at the rate required, while power from the side of the transmission with the slower running sprocket is regenerated to the faster running side through the differential. Turning the planet carrier 12 causes the compound planet gear 11 to revolve around the inside of ring gears 10a, 10b and in so doing it will alter the effective gear ratio operating between those ring gears and thus alter the speed difference between the shafts 7a, 7b. This is due to the inequality of the gear ratios between the ring gears 10a, 10b and the respective gear portions 13a, 13b of the compound planet 11 with which they mesh.

Figure 2:
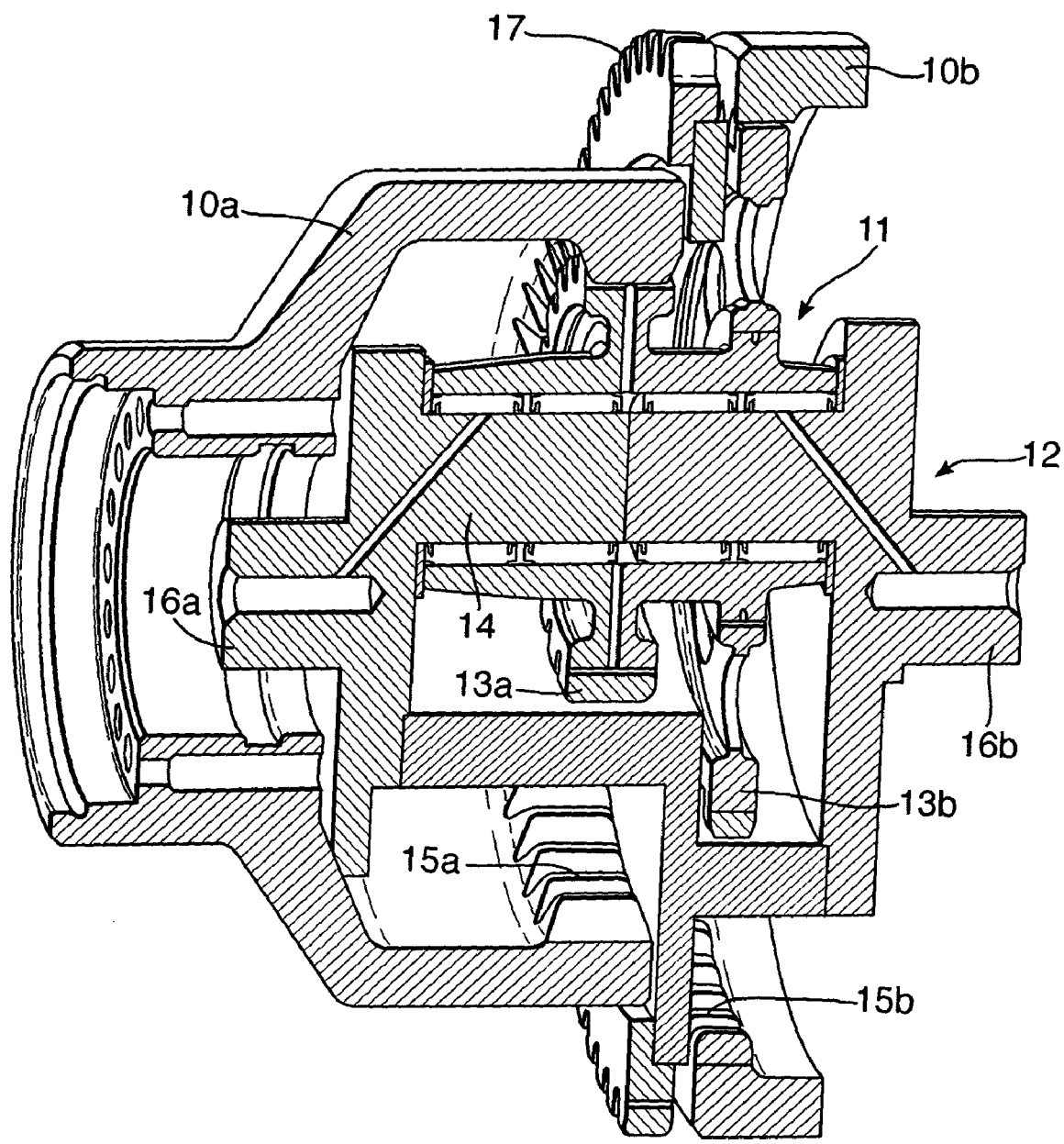
FIG. 2 is a pictorial half-section through a physical embodiment of the differential of FIG. 1, with the right hand ring gear not complete.
Figure 3:
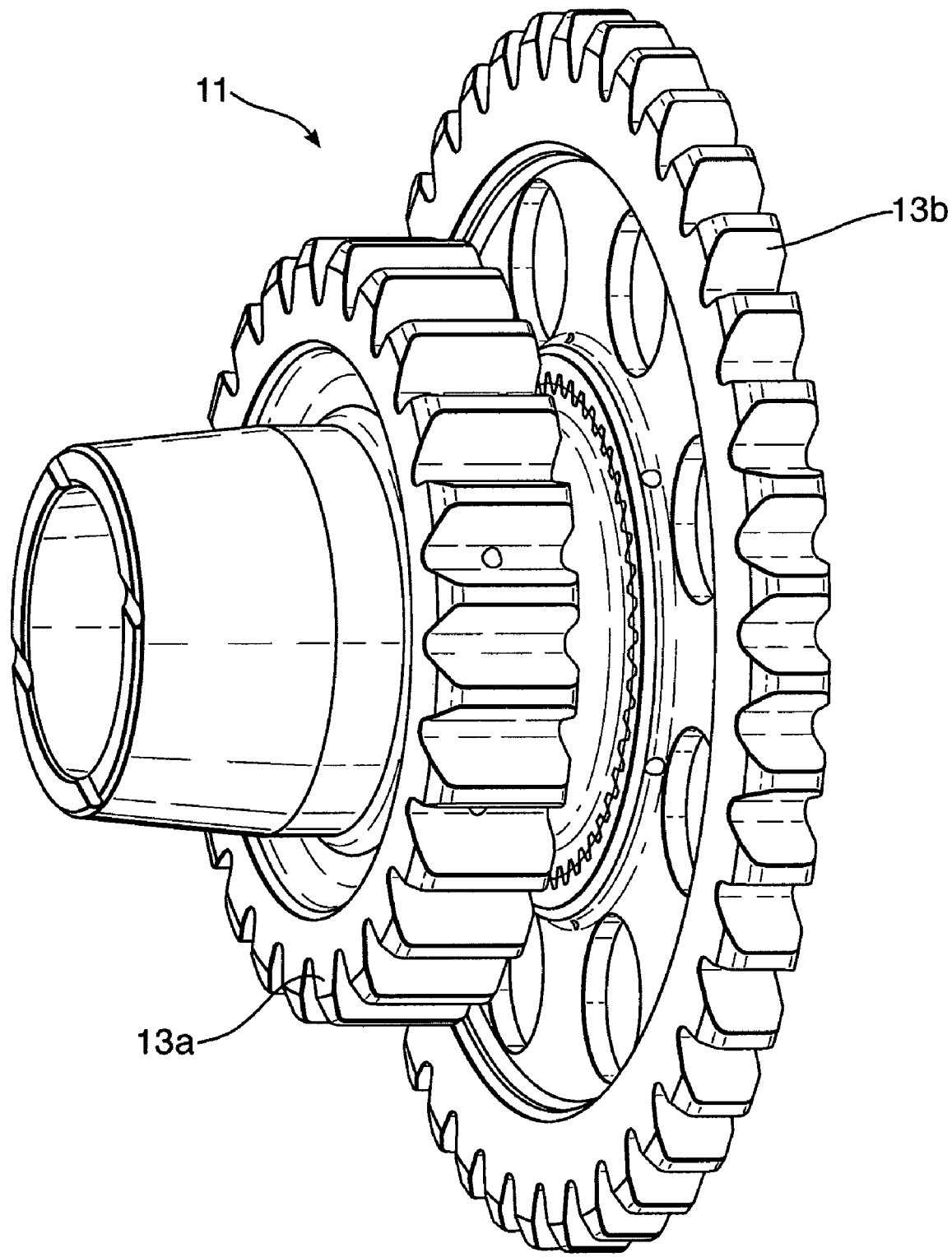
FIG. 3 is a pictorial view of the compound planet gear of the differential of FIGS. 1 and 2.

The above effect can be conceptualised by considering the relationship between the ring gears 10a, 10b and the compound planet gear 11 in FIG. 2. Imagine that ring gear 10a is held stationary and the planet carrier 12 is turning so that planet gear 13a is revolving around inside the ring gear anticlockwise as viewed end-on from the left of FIG. 2. This motion will also cause gear 11 to rotate in the planet carrier 12 (clockwise in relation to the latter from the same veiwpoint) at a rate determined by the ratio of the numbers of teeth on the gears 10a and 13a. Gear 13b will also be caused to rotate at the same rate as it revolves around inside ring gear 10b because it is fast with gear 13a, in so doing causing ring gear 10b to rotate at a rate determined by the difference between the ratios of the numbers of gear teeth between the ring gears 10a, 10b and respective planet gears 13a, 13b. In the illustrated example this rotation of ring gear 10b will be clockwise as viewed end-on from the left of FIG. 2 because there is a higher ratio of gear teeth from gear 13b to gear 10b than there is from gear 13a to gear 10a and gear 10b must therefore be driven in reverse to the sense of revolution of the planet gears to compensate for the fact that gear 13b must rotate by the same amount as gear 13a per revolution of the compound planet 11. Reversing the direction of rotation of the planet carrier under these conditions of course reverses the direction of imposed rotation on gear 10b. Furthermore the faster that the carrier 12 turns in either direction the faster must gear 10b turn with respect to the (assumed stationary in this case) gear 10a. A similar but inverse analysis applies to the rotation of ring gear 10a if it is imagined that ring gear 10b is held stationary and the planet carrier is rotated. Of course equivalent effects occur in the dynamic situation when the gears 10a, 10b on shafts 7a, 7b are already being turned by the propulsion motors 1a, 1b, the relative rotation between the ring gears due to revolution of the planet gears with the rotating carrier then effectively being added/subtracted to the speed difference between the shafts 7a, 7b inherent with a stationary carrier.

While the embodiment of the differential described above features only a single compound planet gear 11 it is alternatively possible to have a plurality of compound planet gears distributed around the carrier 12, although for a given size and speed of ring gears 10a, 10b the individual planet gears would then have to be of smaller diameter and run faster than the single gear 11. A single such gear is currently considered to be the preferred option as it enables relatively large gears 13a, 13b to be utilised, turning on an axis at relatively small radius from the carrier axis, and can achieve high load capacity due to the high contact ratio between the planet gear teeth and the ring gear teeth.

While in the illustrated embodiment the larger ring gear 10b has a higher number of gear teeth than the smaller ring gear 10a and the larger planet gear 13b has a higher number of gear teeth than the smaller planet gear 13a, this is a consequence of choosing the same tooth sizes in both planetary gear sets but is not essential to the functioning of the invention. The important characteristic is that the ratios between the ring gear and planet gear in each set differ, irrespective of the relative numbers or sizes of the teeth as between the two rings 10a, 10b and between the two planets 13a, 13b.

Also while it is preferable to compensate at least to some extent for the inherent speed difference between the shafts 7a, 7b by means of different gear ratios in the reduction stages 3a, 3b or elsewhere for straight line running, this could all be achieved by rotation of the planet carrier 12 if desired and if suitably rated steer motors are employed.

The invention claimed is:

1. A drive configuration for a skid steered vehicle comprising a respective drive member adapted to be located at each side of the vehicle; first and second propulsion motors coupled between said drive members; first and second shafts arranged to be driven by said first and second propulsion motors respectively; a controlled differential coupled between said first and second shafts; and one or more steer motors coupled to said controlled differential; the controlled differential comprising:

first and second ring gears arranged to turn with said first and second shafts, respectively;

a compound planetary gear set comprising one or more compound planet gears and a common planet carrier, a first planet gear of the or each said compound planet being in mesh with the first ring gear and a second planet gear of the or each said compound planet being in mesh with the second ring gear;

the ratios of the number of gear teeth between the first ring gear and the or each said first planet gear and between the second ring gear and the or each said second planet gear being unequal;

said planet carrier being coupled to be rotated by said steer motor(s);

whereby when the planet carrier is stationary said first and second shafts are coupled through said ring gears and compound planet gear(s) to turn together in the same direction with a speed difference; and rotation of the planet carrier varies the speed difference between said first and second shafts, the direction and magnitude of which variation depend respectively on the direction and speed of the rotation of the planet carrier.

2. A drive configuration according to claim 1 further comprising respective gear reduction stages between respective said propulsion motors and drive members, the gear reduction ratios of which stages are unequal and reduce the speed ratio between said drive members as compared to the speed ratio between said first and second shafts when said planet carrier is stationary.

3. A vehicle equipped with a drive configuration according to claim 1.

4. A vehicle equipped with a drive configuration according to claim 2.

5. A drive configuration according to claim 1 wherein there is a single said compound planet gear in said controlled differential.

6. A vehicle equipped with a drive configuration according to claim 5.

* * * * *